(12) United States Patent
Emadi et al.

(10) Patent No.: US 11,448,744 B2
(45) Date of Patent: Sep. 20, 2022

(54) SEQUENTIAL DOPPLER FOCUSING

(71) Applicant: Woven Planet North America, Inc., Los Altos, CA (US)

(72) Inventors: Mohammad Emadi, San Jose, CA (US); Jamaledin Izadian, San Jose, CA (US)

(73) Assignee: Woven Planet North America, Inc., Los Altos, CA (US)

( * ) Notice: Subject to any disclaimer, the term of this patent is extended or adjusted under 35 U.S.C. 154(b) by 100 days.

(21) Appl. No.: 16/732,118

(22) Filed: Dec. 31, 2019

(65) Prior Publication Data
US 2021/0199787 A1  Jul. 1, 2021

(51) Int. Cl.
*G01S 13/53* (2006.01)
*G01S 13/931* (2020.01)
*G08G 1/16* (2006.01)

(52) U.S. Cl.
CPC ............ *G01S 13/53* (2013.01); *G01S 13/931* (2013.01); *G08G 1/166* (2013.01)

(58) Field of Classification Search
CPC ........ G01S 13/53; G01S 13/931; G08G 1/166
USPC .................................... 342/357.78
See application file for complete search history.

(56) References Cited

U.S. PATENT DOCUMENTS

| | | | | |
|---|---|---|---|---|
| 4,042,925 A | * | 8/1977 | Albanese | G01S 13/325 342/194 |
| 4,471,357 A | * | 9/1984 | Wu | G01S 13/9011 342/25 D |
| 5,036,325 A | * | 7/1991 | O'Brien | G01S 13/526 342/162 |
| 6,078,281 A | * | 6/2000 | Milkovich | G01S 7/2926 342/162 |
| 6,633,253 B2 | * | 10/2003 | Cataldo | G01S 13/5244 342/25 R |
| 7,725,150 B2 | * | 5/2010 | Tupin, Jr | G01S 13/0209 600/407 |

(Continued)

FOREIGN PATENT DOCUMENTS

| | | | | |
|---|---|---|---|---|
| KR | 20180130900 A | | 12/2018 | |
| WO | WO-2009150452 A1 | * | 12/2009 | ........... G01S 13/227 |
| WO | WO-2016110842 A1 | * | 7/2016 | ........... G01S 13/106 |

OTHER PUBLICATIONS

International Search Report and Written Opinion for International Application No. PCT/US2020/066844, dated Apr. 15, 2021.

*Primary Examiner* — Peter M Bythrow
*Assistant Examiner* — Nuzhat Pervin
(74) *Attorney, Agent, or Firm* — Christopher G. Darrow; Darrow Mustafa PC

(57) ABSTRACT

In one embodiment, a method includes configuring a radar transceiver to transmit a first number of radar pulses at a first pulse repetition frequency (PRF); and determining a first value corresponding to a first object based on a first radar data received in response to the first number of radar pulses. The first object is identified based on the first value being higher than a predetermined threshold value. The method also includes configuring the radar transceiver to transmit a second number of radar pulses at a second PRF that is higher than the first PRF; determining a second value of the first object based on a second radar data received in response to the second number of radar pulses; and associating the second value with information of the first object.

19 Claims, 12 Drawing Sheets

(56) References Cited

U.S. PATENT DOCUMENTS

| | | | |
|---|---|---|---|
| 9,057,785 B1* | 6/2015 | Lee | G01S 13/582 |
| 9,157,992 B2* | 10/2015 | Wang | G01S 13/5246 |
| 9,297,888 B2* | 3/2016 | Lee | G01S 7/2926 |
| 9,484,947 B1* | 11/2016 | Nguyen | H03M 1/002 |
| 9,689,979 B2* | 6/2017 | Dai | G01S 7/28 |
| 9,735,799 B1* | 8/2017 | Nguyen | H03M 1/06 |
| 10,473,758 B2* | 11/2019 | Caldwell | G01S 7/38 |
| 2011/0095939 A1* | 4/2011 | Martin | G01S 13/582 342/109 |
| 2011/0295549 A1* | 12/2011 | Takabayashi | G01S 13/86 702/142 |
| 2012/0139789 A1* | 6/2012 | Smith | G01S 5/06 342/385 |
| 2013/0342388 A1* | 12/2013 | Maeno | G01S 7/2813 342/202 |
| 2015/0130654 A1* | 5/2015 | Dai | G01S 13/22 342/204 |
| 2016/0011300 A1* | 1/2016 | Lee | G01S 13/582 342/127 |
| 2016/0054439 A1* | 2/2016 | Brookner | G01S 13/91 342/36 |
| 2016/0195607 A1* | 7/2016 | Roulston | G01S 13/106 342/201 |
| 2016/0349363 A1* | 12/2016 | Millar | G01S 13/931 |
| 2016/0359235 A1* | 12/2016 | Driscoll | G01S 13/931 |
| 2017/0220522 A1* | 8/2017 | Lerner | G06F 17/142 |
| 2017/0293019 A1* | 10/2017 | Caldwell | G01S 7/38 |
| 2018/0136328 A1* | 5/2018 | Moss | G01S 7/354 |
| 2018/0183650 A1* | 6/2018 | Zhang | H04B 1/38 |
| 2019/0170868 A1* | 6/2019 | Hanisch | G01S 13/22 |
| 2019/0212430 A1* | 7/2019 | Akamine | G01S 7/352 |
| 2020/0284876 A1* | 9/2020 | Hurd | G01S 7/414 |
| 2020/0324761 A1* | 10/2020 | Magzimof | B60W 30/09 |
| 2021/0156990 A1* | 5/2021 | Madhow | G01S 13/86 |

* cited by examiner

SEQUENTIAL DOPPLER FOCUSING

BACKGROUND

A vehicle with a driving-control system may be a vehicle that is capable of sensing its environment and navigating with reduced to no human input. The vehicle may be equipped with a variety of systems or modules for enabling it to determine its surroundings and safely navigate to target destinations. For example, the driving-control system may be an integrated computing system (e.g., one or more central processing units, graphical processing units, memory, and storage) for controlling various operations of the vehicle, such as driving and navigating. To that end, the driving-control system may process data from one or more sensor arrays. For example, an autonomous vehicle may have optical cameras for, e.g., recognizing roads and lane markings; infrared cameras for, e.g., night vision; LiDARs for, e.g., detecting 360° surroundings; radar for, e.g., detecting distant hazards; stereo vision for, e.g., spotting hazards such as pedestrians or tree branches; wheel sensors for, e.g., measuring velocity; ultrasound for, e.g., parking and obstacle detection; global positioning system (GPS) for, e.g., determining the vehicle's current geolocation; and/or inertial measurement units, accelerometers, gyroscopes, and/or odometer systems for movement or motion detection. Data from these systems and modules may be used by the driving-control system to safely guide or assist the navigation of the vehicle.

Driving-control systems have a limited computational budget (e.g., terms of computing time and power) for performing critical navigation functions, such as, for example, perception of agents in the surrounding environment or prediction of the future locations of these agents. Different agents in the field of view (FOV) of the radar may have different velocities that need to be determined with high resolution, which may tax the limited computational and power budget of the vehicle.

DESCRIPTION OF EXAMPLE EMBODIMENTS

Figure 1A:
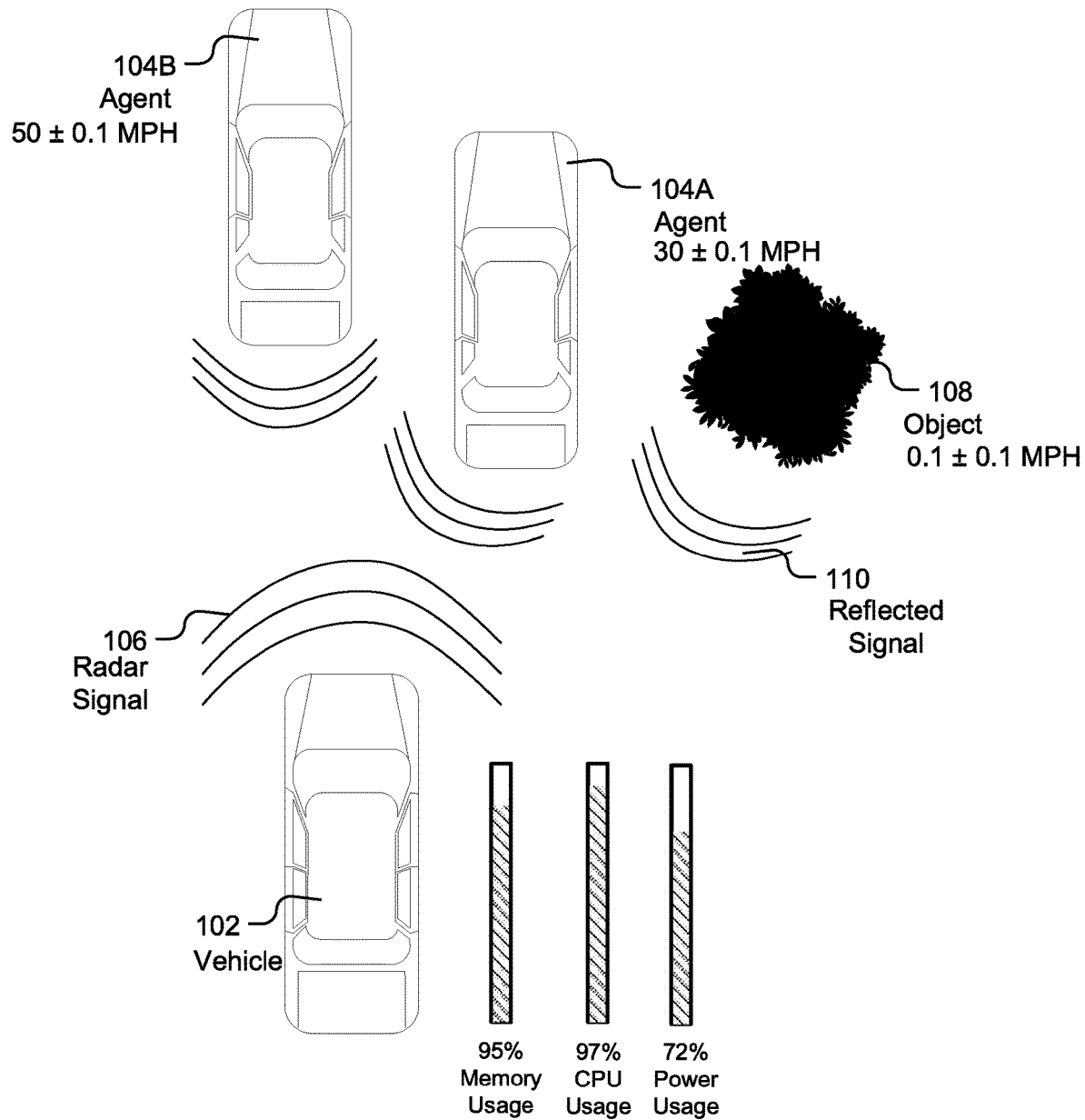
FIG. 1A illustrates an example scenario of a vehicle detecting objects using high-resolution Doppler measurements.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Subject matter described herein is generally directed to accurately determining the velocity of objects with reduced power consumption and reduced computational resources. A vehicle with a driving-control system may be a vehicle that is capable of sensing its environment and navigating with reduced to no human input. The vehicle may be equipped with a variety of systems or modules for enabling it to determine its surroundings and safely navigate to target destinations. For example, the driving-control system may be an integrated computing system (e.g., one or more central processing units, graphical processing units, memory, and storage) for controlling various operations of the vehicle, such as driving and navigating. To that end, the driving-control system may process data from one or more sensor arrays. For example, an autonomous vehicle may have optical cameras for, e.g., recognizing roads and lane markings; infrared cameras for, e.g., night vision; LiDARs for, e.g., detecting 360° surroundings; radar for, e.g., detecting distant hazards; stereo vision for, e.g., spotting hazards such as pedestrians or tree branches; wheel sensors for, e.g., measuring velocity; ultrasound for, e.g., parking and obstacle detection; global positioning system (GPS) for, e.g., determining the vehicle's current geolocation; and/or inertial measurement units, accelerometers, gyroscopes, and/or odometer systems for movement or motion detection. Data from these systems and modules may be used by the driving-control system to safely guide or assist the navigation of the vehicle.

Embodiments described herein may benefit a variety of platforms, systems, or methods, especially those that may benefit from low-cost, low-power, or small-size radar systems, such as, for example, robotic systems or portable radar systems. As an example and not by way of limitation, driving-control systems have a limited computational budget (e.g., in terms of time and resources) and power budget for performing critical navigation functions, such as, for example, perception of agents in the surrounding environment or prediction of the future locations of these agents. A perception module of the driving-control system processes the data from the sensors of the vehicle and generates a representation of the current state of the vehicle's environment, including agents that may be hazards to the vehicle. Depending on the number and type of sensors, the amount of sensor data that needs to be processed to generate the representation of the environment and identify agents may be immense, which may tax the limited computational budget of the driving-control system.

It is useful for the driving-control system to reduce the computational and power burden of determining the velocity of the agents in the radar system field of view (FOV) to a high degree of accuracy for accurate object detection, characterization, and trajectory prediction. Embodiments described herein relate to using different tiers of radar pulses to more efficiently use the processing resources of the system. For example, embodiments may use radar pulses having low-resolution Doppler measurements to discover one or more ranges of discrete frequency values (frequency bins) that correspond to agents in the FOV of the radar system. The radar system may be configured to transmit one or more radar signals using high-resolution Doppler measurements and limiting the high-resolution processing of the radar signals to the frequency bins that correspond to the agents. By focusing data acquisition and spectral estimation to the frequency bins corresponding to the agents minimizes the power used to generate the radar signals to capture the large sample of radar data to determine the Doppler of the agents with a high degree of precision. Altering the PRF of the radar system from low-resolution Doppler measurements to high-resolution Doppler measurements when objects are detected where more granular or higher resolution Doppler information may be helpful for the system to understand and predict the actions or trajectory of objects/agents.

FIG. 1A illustrates an example scenario of a vehicle detecting objects using high-resolution Doppler measurements. A vehicle 102 may include a sensor array that includes a radio detection and ranging (radar) transceiver. Radar is a detection system that uses radio waves to extract information about the agents in the radar system FOV. As described in more detail below, a radar system that includes a transmitter with channels that transmits electromagnetic waves in the radio or microwave frequencies, one or more antenna elements, a receiver with channels to receive the data from the antenna elements, and a processor to process the data to determine properties of the object(s) (e.g., velocity and range) surrounding vehicle 102. The radio waves from the transmitter are reflected by objects and agents in the FOV and are detected by the receiver. The reflected signal is processed to determine the range, azimuth angle, and/or velocity of the objects.

A driving-control system of vehicle 102 may receive data from the radar transceiver, as well as, data from other sensors of the sensor array to determine the environment, including agents 104A-104B and objects 108, surrounding vehicle 102. As described in more detail below, the radar transceiver is configured to transmit radio-frequency (RF) pulses 106 and receive a reflected signal 110 from agents 104A-104B and objects 108. Reflected radar signals 110 may be processed to extract data corresponding to a velocity (Doppler) measurement, distance (range) measurement, and azimuth (lateral) angle measurement of agents 104A-104B and objects 108.

Radar pulses are reflected from objects 108 and agents 104A-104B in the FOV. The Doppler measurement measures the frequency difference between reflected radar signal 110 and transmitted RF pulses 106. For agents moving towards vehicle 102, successive reflected radar signals 110 have a shorter round-trip distance to travel. This is because these agents have moved closer in the interval of time between the previous and current radar pulses. Since the frequency is inversely proportional to the wavelength, the frequency of the reflected radar pulses 110 appears to increase, resulting in a Doppler frequency shift. If agent 104A or agent 104B is moving away from vehicle 102, then the opposite happens. Each successive reflected radar signals 110 have a longer round-trip distance to travel, so the time between the arrival of reflected radar signals 110 is increased, resulting in a longer wavelength, and an apparent lower frequency. Different agents or objects in the FOV of the vehicle may have different velocities that need to be determined with high resolution. By measuring a Doppler frequency shift from reflected radar signals 110 or the change of frequency between the transmitted RF pulses 106 and reflected radar signals 110 due to the movement of agents 104A-104B, the radar system is able to measure the relative velocity of all objects returning reflected radar signals 110 to the radar system.

As described in more detail below, the resolution of determining the Doppler frequency shift of agents 104A-104B is a function of the number of pulses of the transmitted radar signal 106. The amount of power used in the transmission of transmitted radar signal 106 increases with the number of pulses as well. In the example scenario illustrated in FIG. 1A, vehicle 102 transmits transmitted radar signal 106 with a number of pulses or PRF for a high-resolution Doppler measurement. The driving-control system of vehicle 102 receives data from reflected radar signals 110 and performs a fast Fourier transform (FFT) based on the data from reflected radar signals 110. The FFT converts reflected radar signals 110 from the time domain to a representation in the frequency domain, where the time-based reflected radar signals 110 are converted to amplitude as a function of frequency. Performing an FFT on reflected radar signals 110 that has a large number of pulses (e.g., 1024 pulses) may be computationally burdensome and memory intensive. As an example and not by way of limitation, the driving-control system of vehicle 102 may be able to determine the speed of agents 104A-104B to within 0.1 miles per hour (MPH) accuracy using transmitted radar signal 106 with a large number of pulses. This level of detail may be useful for situations where highly detailed understanding of speed and speed changes of agents 104A-104B are important to a driving-control system. However, there are many times when such high PRF radar signals may be non-ideal use of computing and power resources of the vehicle system (e.g., no objects immediately within range of the driving-control system, slower-moving objects detected, or lower acceleration objects detected).

Figure 1B:
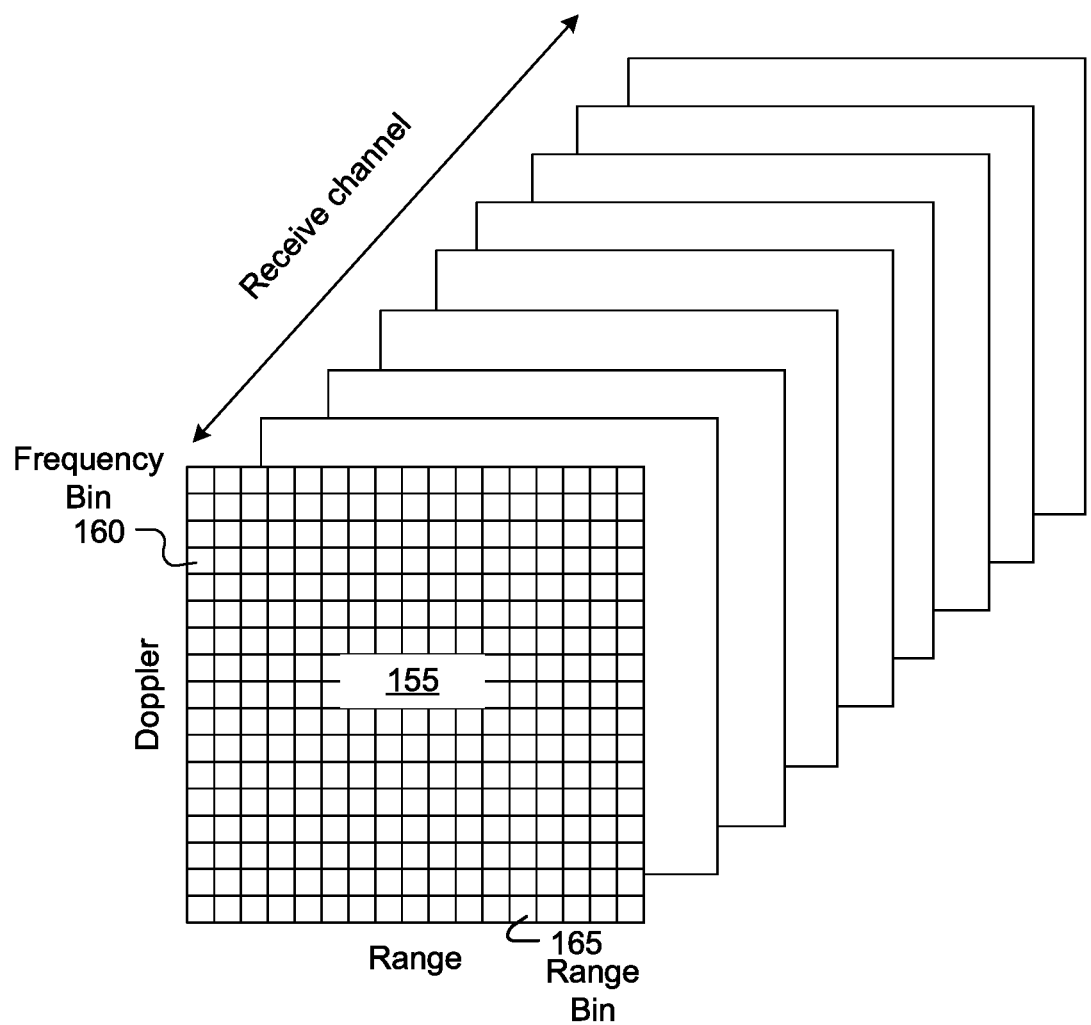
FIG. 1B illustrates an example cube of radar data from high-resolution Doppler measurements.

FIG. 1B illustrates an example cube of radar data from high-resolution Doppler measurements. The reflected radar signals may be processed to extract data corresponding to a velocity (Doppler) measurement and distance (range) measurement. The data extracted from the reflected radar signals may form a radar data cube 150 that illustrates the computing and memory resources needed to process the reflected radar signals. In particular embodiments, the Doppler and range data may be stored and processed as a 2D range-Doppler (RD) N×M matrix 155, where N is the number of frequency or Doppler bins 160 of the FFT determining the Doppler measurement and M is the number of range bins 165. Each frequency bin 160 may correspond to an amount of Doppler frequency shift resulting from the movement of agents in the FOV of the radar system. In particular embodiments, the entries for each 2D RD matrix 155 may be the value of the FFT for each frequency bin at each range bin 165. As an example and not by way of limitation, one or more 2D RD matrix 155 may be a sparse matrix. As N, the number of Doppler bins 160 or M, the number of range bins 165 changes, the size of 2D RD matrix 155 expands or contracts. The number N of Doppler bins 160 and the resolution of the Doppler measurements is proportional to the number of pulses transmitted by the radar system. Therefore, the computational and memory burden to process the data for each 2D RD matrix 155 increases or decreases with the resolution of the Doppler or range measurements. In other words, if N the number of frequency bins 160 for the Doppler measurements increases, the computational and memory burden to process the data for each 2D RD matrix 155 increases. The number of 2D range-Doppler matrices 155 formed from the data measured is the number of antenna elements or receiving channels of the receiving antenna. By focusing the data acquisition and spectral estimation to the frequency windows corresponding to the agents minimizes the computational and memory burden of storing and processing the high-resolution Doppler data.

Figure 2A:
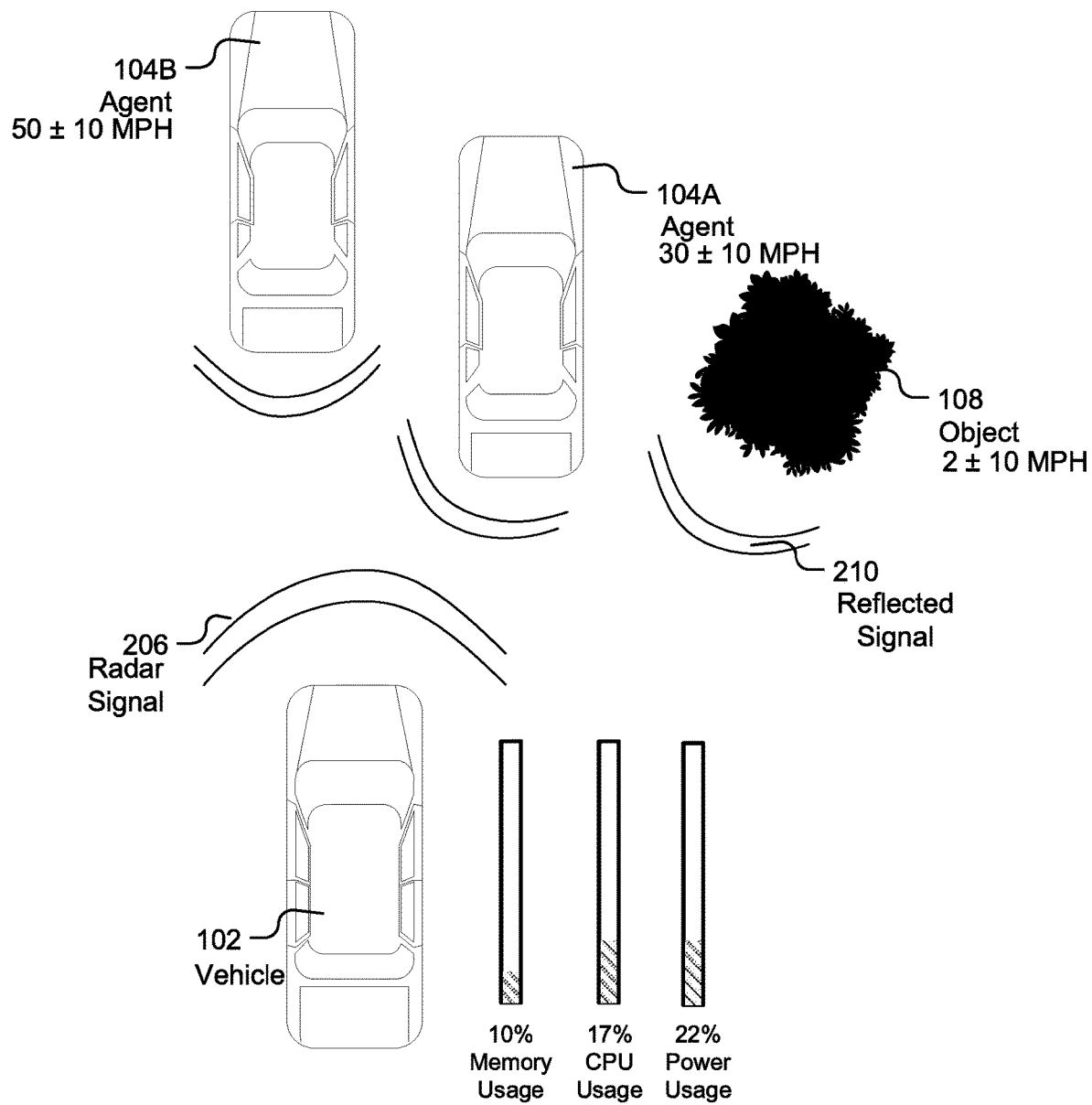
FIG. 2A illustrates an example scenario of a vehicle detecting objects using sequential low-resolution Doppler measurements.

FIG. 2A illustrates an example scenario of a vehicle detecting objects using sequential low-resolution Doppler measurements. In particular embodiments, vehicle 102 may transmit radar signals 206 with a relatively low rate of sending pulses or pulse repetition frequency (PRF), described in more detail below, (e.g., 50 pulses per second). In the example scenario illustrated in FIG. 2A, vehicle 102 transmits transmitted radar signal 206 at a transmission frequency for a sequential low-resolution Doppler measurement. The driving-control system of vehicle 102 receives data from reflected signal 210 from agents 104A-104B and object 108 and performs an FFT based on the data from reflected signal 210. Performing an FFT on reflected signal 210 that has a low number of pulses or transmission frequency may be relatively computationally inexpensive and memory consumption. As an example and not by way of limitation, the driving-control system of vehicle 102 may be able to determine the speed of agents 104A-104B to within 10 MPH accuracy using transmitted radar signal 206 with a small number of pulses.

Figure 2B:
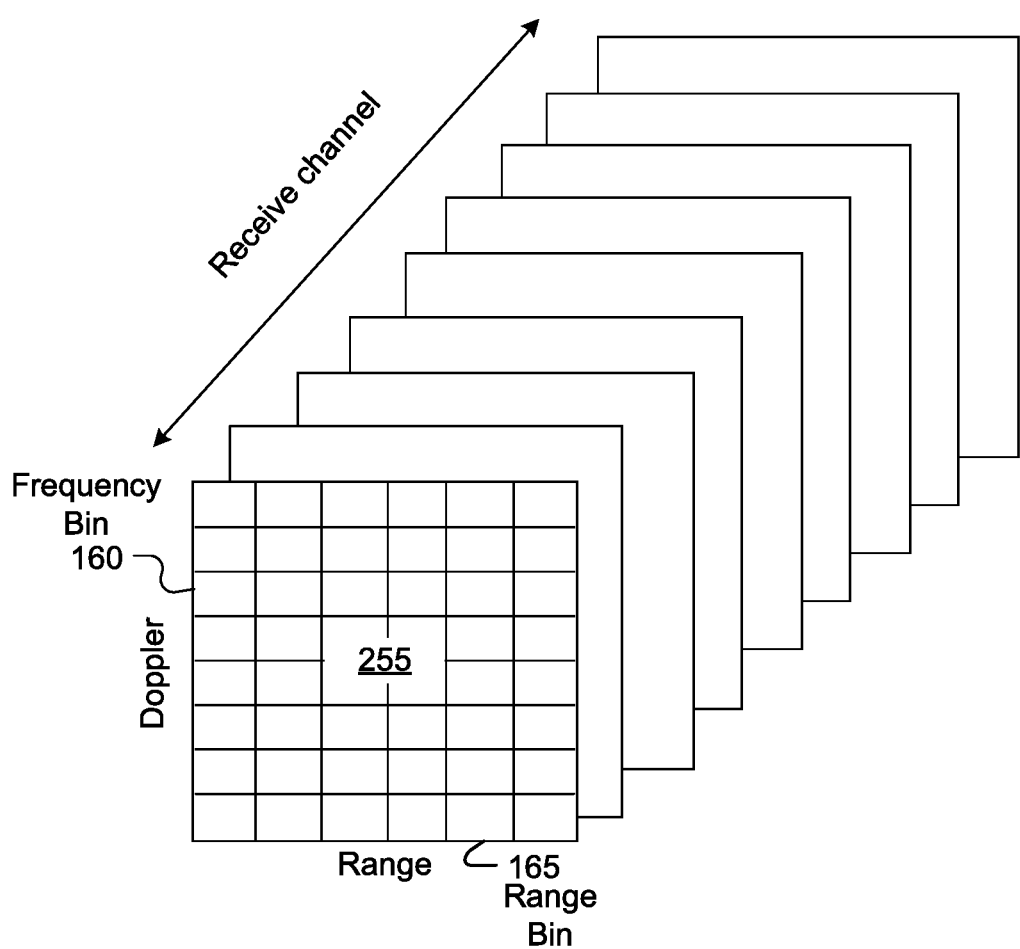
FIG. 2B illustrates an example cube of radar data from low-resolution Doppler measurements.

FIG. 2B illustrates an example cube of radar data from sequential low-resolution Doppler measurements. The data extracted from the reflected radar signals from the low PRF radar signals may form a radar data cube 250 that illustrates the computing and memory resources needed to process the low PRF radar signals. The dimensions of N×M matrix 255 are proportional to the number of pulses transmitted by the radar system over a predetermined time period. By decreasing the PRF of the radar signal, which reduces number of frequency bins 160, the size of N×M matrix 255 and radar cube 250 may be significantly reduced compared to the radar cube and N×M matrix corresponding to high-resolution measurements over the entire frequency spectrum, illustrated in the example of FIG. 1B.

Figure 3A:
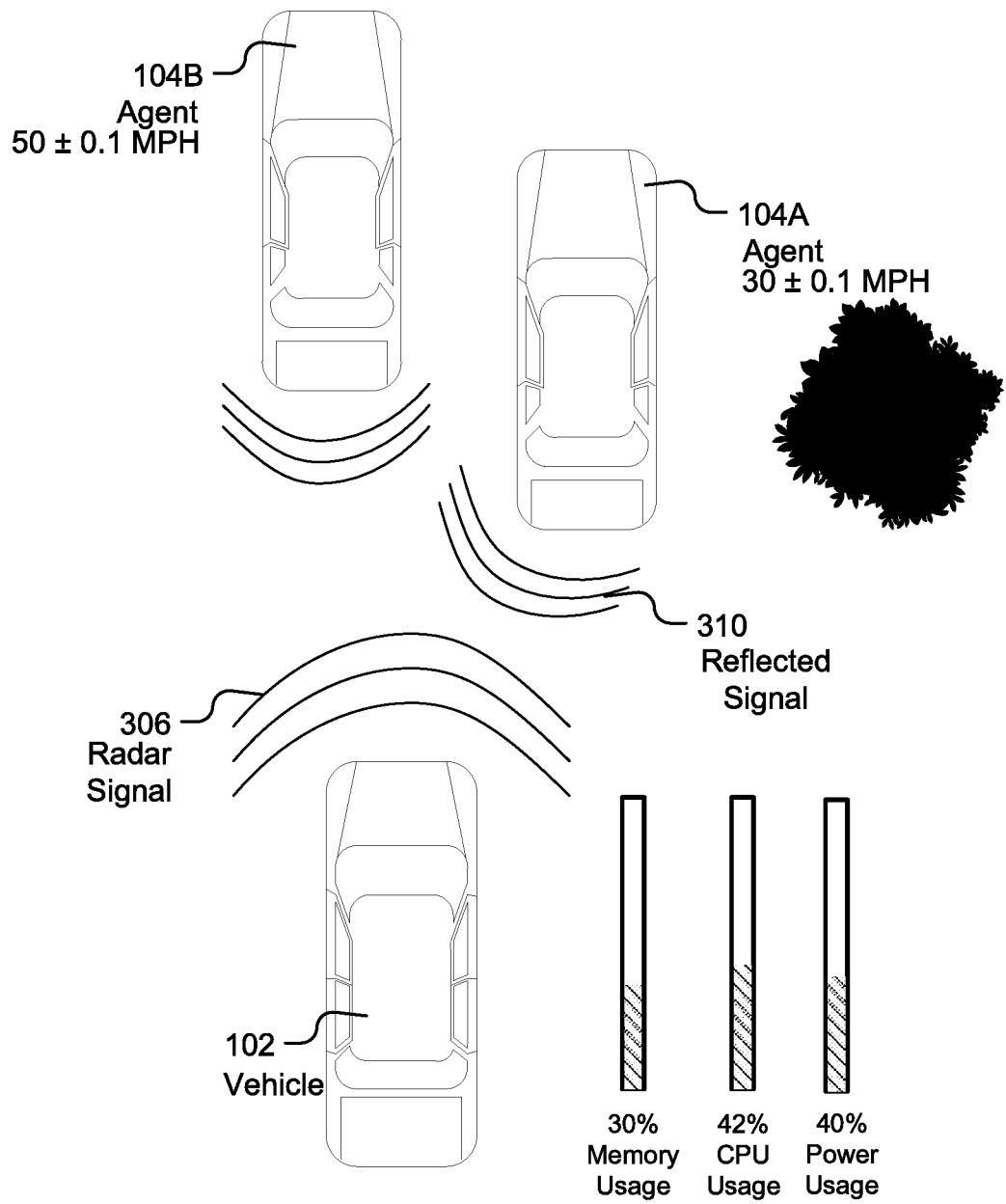
FIG. 3A illustrates an example scenario of a vehicle detecting objects using sequential high-resolution Doppler measurements.

FIG. 3A illustrates an example scenario of a vehicle detecting objects using sequential high-resolution Doppler measurements. As described in more detail below, the driving-control system of vehicle 102 may identify agents 104A-104B based on the sequential high-resolution measurement illustrated and described in the example of FIG. 3A. In particular embodiments, vehicle 102 may transmit radar signals 306 with a high number of pulses or transmission frequency (e.g., 1024 pulses per second) that correspond to the Doppler frequency shift of agents 104A-104B. In the example scenario illustrated in FIG. 3A, vehicle 102 transmits transmitted radar signal 306 with a number of pulses for a sequential high-resolution Doppler measurement, where the number of pulses is dependent on the required amount of resolution of the Doppler shift to accurately determine the speed of agents 104A-104B for the scenario of vehicle 102. The driving-control system of vehicle 102 receives data from reflected signal 310 from agents 104A-104B and performs an FFT based on the data from reflected signal 310. As described in more detail below in the example of FIG. 3B, though the number of pulses transmitted by the radar system in this scenario is relatively high, the data storage and processing are reduced by limiting the radar data that is stored and processed.

Figure 3B:
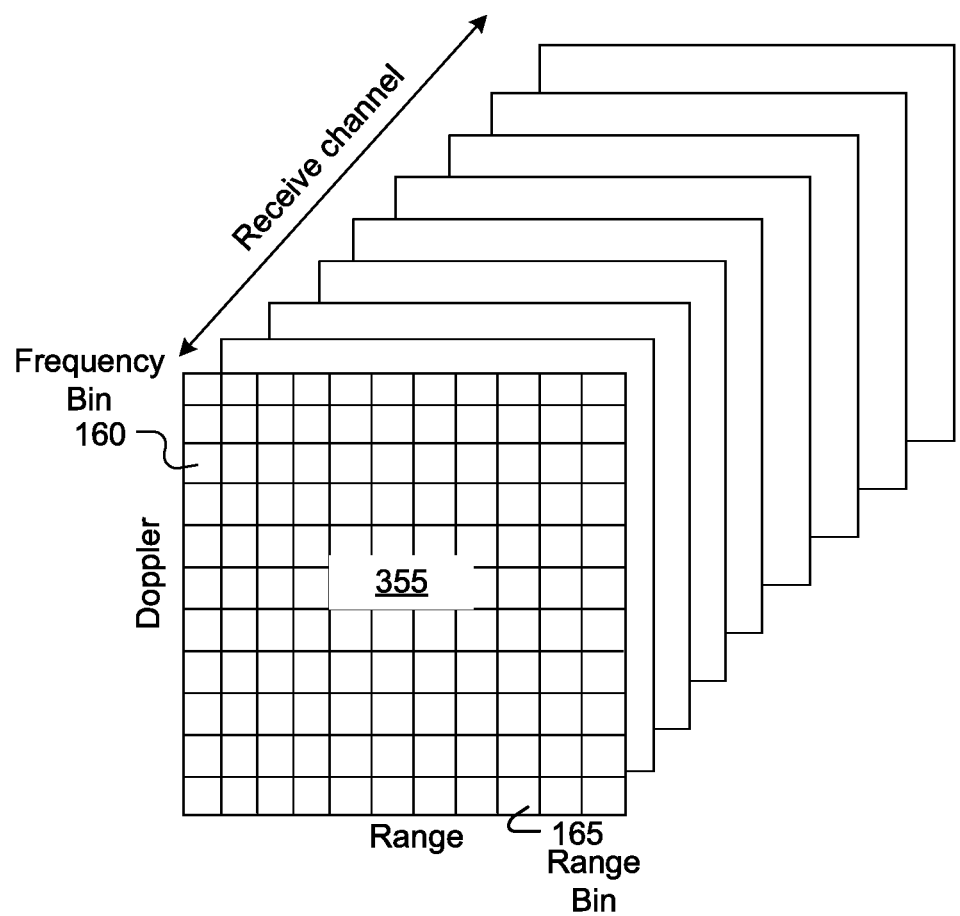
FIG. 3B illustrates an example cube of radar data from sequential high-resolution Doppler measurements.

FIG. 3B illustrates an example cube of radar data from sequential high-resolution Doppler measurements. The data extracted from the reflected radar signals from the sequential high-PRF radar signals may form a radar data cube 350 that illustrates the computing and memory resources needed to process the high PRF radar signals. As described in more detail below, the sequential high-PRF measurements limit the data storage and processing of the reflected radar signals to frequency bins 160 that correspond to agents in the FOV of the radar system. The dimensions of N×M matrix 355 is proportional to the number of pulses transmitted by the radar system over a predetermined period of time, but by limiting the data storage and processing the radar signal to particular frequency bins, the size of N×M matrix 355 and radar cube 350 may be significantly reduced compared to the radar cube and N×M matrix corresponding to high-resolution measurements over the entire frequency spectrum, illustrated in the example of FIG. 1B.

Figure 4:
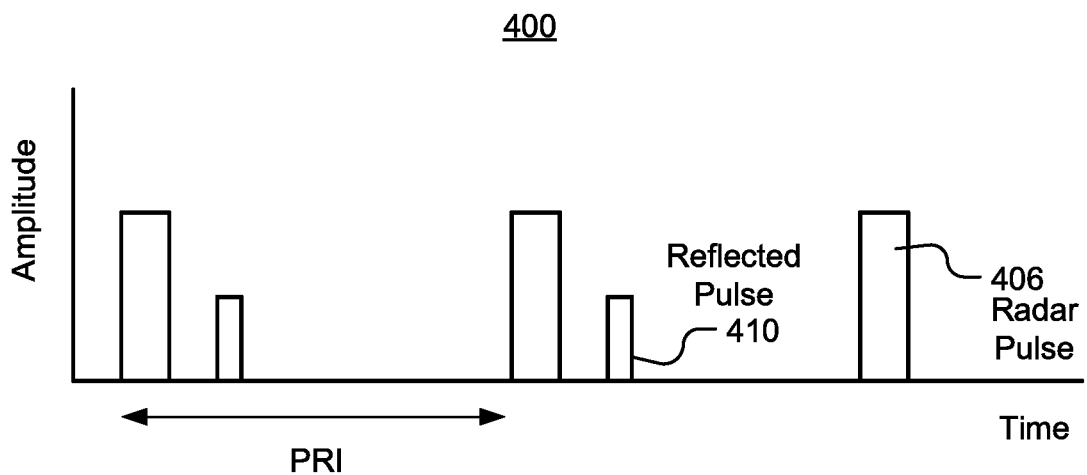
FIGS. 4-5 illustrate an example low pulse repetition frequency (PRF) and an example high PRF radar pulse train.
Figure 5:
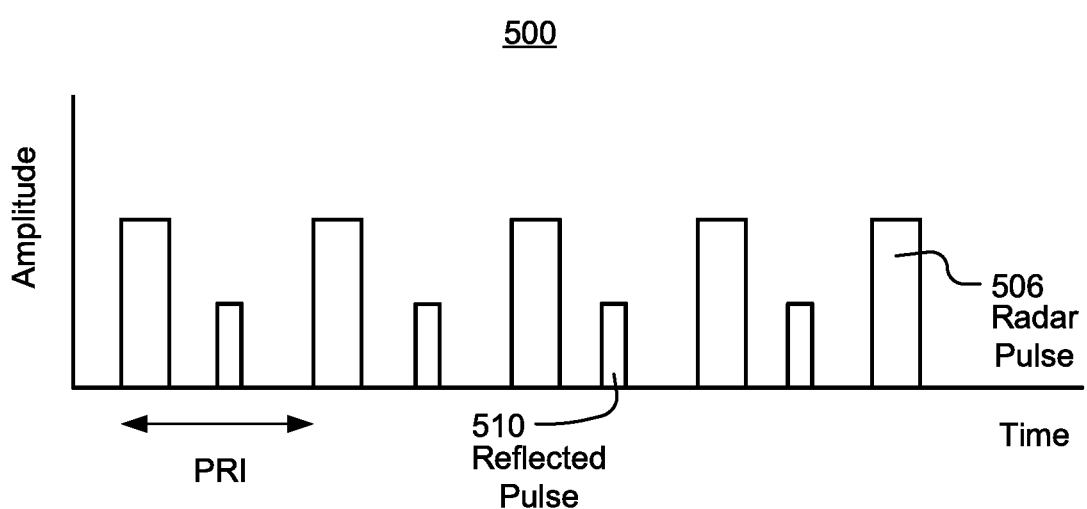

FIGS. 4-5 illustrate an example low pulse repetition frequency (PRF) and an example high PRF radar pulse train. In particular embodiments, the radar signal is a modulation of the carrier frequency ($f_c$) that is implemented as a periodic sequence of rectangular pulses, as illustrated in the examples of FIGS. 4-5. A defining characteristic of a radar pulse train (e.g., 400 or 500) is the pulse repetition frequency (PRF) or pulse repetition interval (PRI). The PRF is the number of radar pulses that are transmitted per second, while PRI is the time interval between radar pulses. PRF and PRI are related metrics and the PRF is the inverse of the PRI or 1/PRI.

For accurate Doppler frequency shift or relative velocity measurements, the Doppler frequency shift from reflected radar signal (e.g., 410 or 510) from the agents should be less than the PRF of pulse trains 400 or 500. For accurate range measurements, the reflected radar signal 410 should be received before the next radar pulse 406 is transmitted. For the high PRI (low PRF) scenario illustrated in the example of FIG. 4, with a high PRI (low PRF) the reflected signal has time to be received by the radar system before the next radar pulse 406 is transmitted.

While it is desirable to use as high a value of PRF as possible to obtain the highest resolution determination of the Doppler, the PRF is constrained by the need to be able to accurately determine the range of the agents as well. When the PRI (time between pulses) is shortened (PRF increased) to the point where the next radar pulse 506 is transmitted before the reflected radar pulse is received, the time to the previous reflected pulse 510 may appear less than the actual time it took, giving a false (ambiguous) shorter range. Pulse trains 500 with lower PRIs (higher PRFs), illustrated by the example of FIG. 5, increases the resolution of the determination of the Doppler frequency shift by increasing the number of frequency bins.

Figure 6:
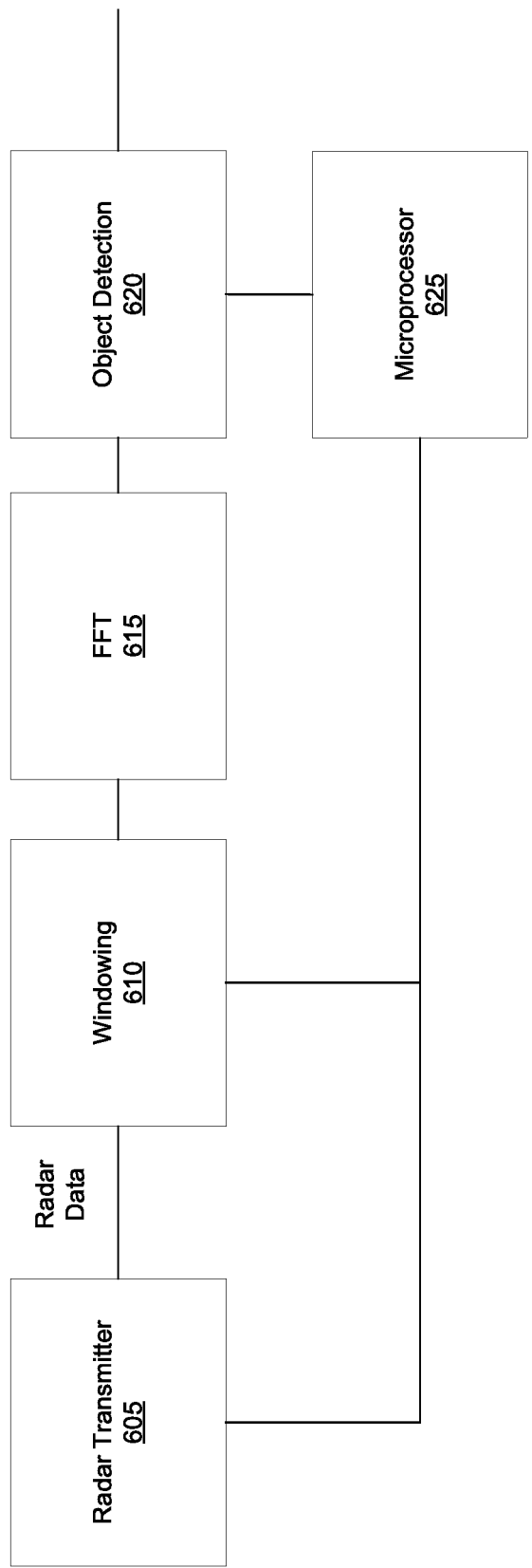
FIG. 6 illustrates an example computing architecture for high-resolution Doppler measurements.

FIG. 6 illustrates an example computing architecture for high-resolution Doppler measurements. A driving-control system of a vehicle has a limited computational and vehicle power budget to process sensor data to determine which data points belong to a particular object and track the objects surrounding the vehicle. In particular embodiments, a microprocessor 625 may configure a radar transmitter 605 to transmit a radar signal with a relatively low PRF (e.g., 100 pulses). Low PRF radar signals may provide radar data that may be used for the detection of objects at a maximum range. A windowing module 610 may isolate frequency bands corresponding to agents in the FOV of the radar system, described in more detail below. In particular embodiments, in the low-resolution mode windowing module 610 does not operate on the reflected radar signal and transmits the data of the reflected radar signal to an FFT module 615. FFT module 615 may perform an FFT on radar data to determine the Doppler of agents in the FOV of the radar system. The number of frequency bins of the Due to the low PRF of the initial radar data, the Doppler value from FFT module 615 is a low-resolution Doppler value (e.g., corresponding to 50±10 MPH).

An object detection module 620 may analyze the results from FFT module 610 to determine one or more frequency bins correspond to agents in the FOV of the radar system. In particular embodiments, object detection module 620 may identify frequency bins based on the value of the FFT being higher than a predetermined threshold value for an object. In particular embodiments, the frequency bands may be identified based on the RSSI of the radar data corresponding to the objects being higher than a predetermined RSSI threshold value. In other words, the computing system may identify frequency bins based on the strength of the reflected signal or the speed of an agent being higher than a threshold level.

In particular embodiments, microprocessor 625 may receive information identifying the frequency bins corresponding to the agents from object detection module 620 and configure radar transmitter 605 to send radar signals with a high PRF (e.g., 1024 pulses). In addition, microprocessor 625 may transmit information identifying the frequency bins of the agents to windowing module 610. In the high-resolution mode, windowing module 610 isolates frequency bands corresponding to agents in the FOV of the radar system by filtering the data of reflected radar signal outside the frequency bands corresponding to agents. As an example and not by way of limitation, windowing module 610 may apply a window function that has a main lobe (highest response) corresponding to the frequency bin of interest and dampens the response outside the frequency bin of interest. In other words, windowing module 610 may filter the time domain signal to remove data from the radar data that does not include a reflected radar signal. As an example and not by way of limitation, in the time domain, the radar data collects data over the entire PRI of the transmitted radar signal, which may include reflected radar signals at a times $t_1$ and $t_2$ corresponding to readings from two agents. By applying a window function, windowing module 610 may filter the radar data to only include data within a range of times $t_1$ and $t_2$.

In addition, windowing module 610 may filter frequency bins corresponding to low RSSI values. These frequency bins having low RSSI values may correspond to noise in the radar system or agents at a distance that is not of interest to the driving-control system. As described in more detail above, radar signals with a high PRF may be used to determine Doppler frequency shifts with high resolution. High PRF radar signals transmit more pulses in a given interval of time leading to higher transmit power levels. The radar data that only includes the frequency bins corresponding to the agents may be processed by FFT module 615. By limiting the data storage and processing of high PRF radar signals to the specific Doppler frequency bins corresponding to agents in the FOV of the radar system to computational and memory burden of performing the FFT by FFT module 615 may be minimized. Because the radar data is measured from a high-PRF radar signal, FFT module 615 may determine the Doppler frequency shift to a high resolution (e.g., 50±0.1 MPH).

Figure 7:
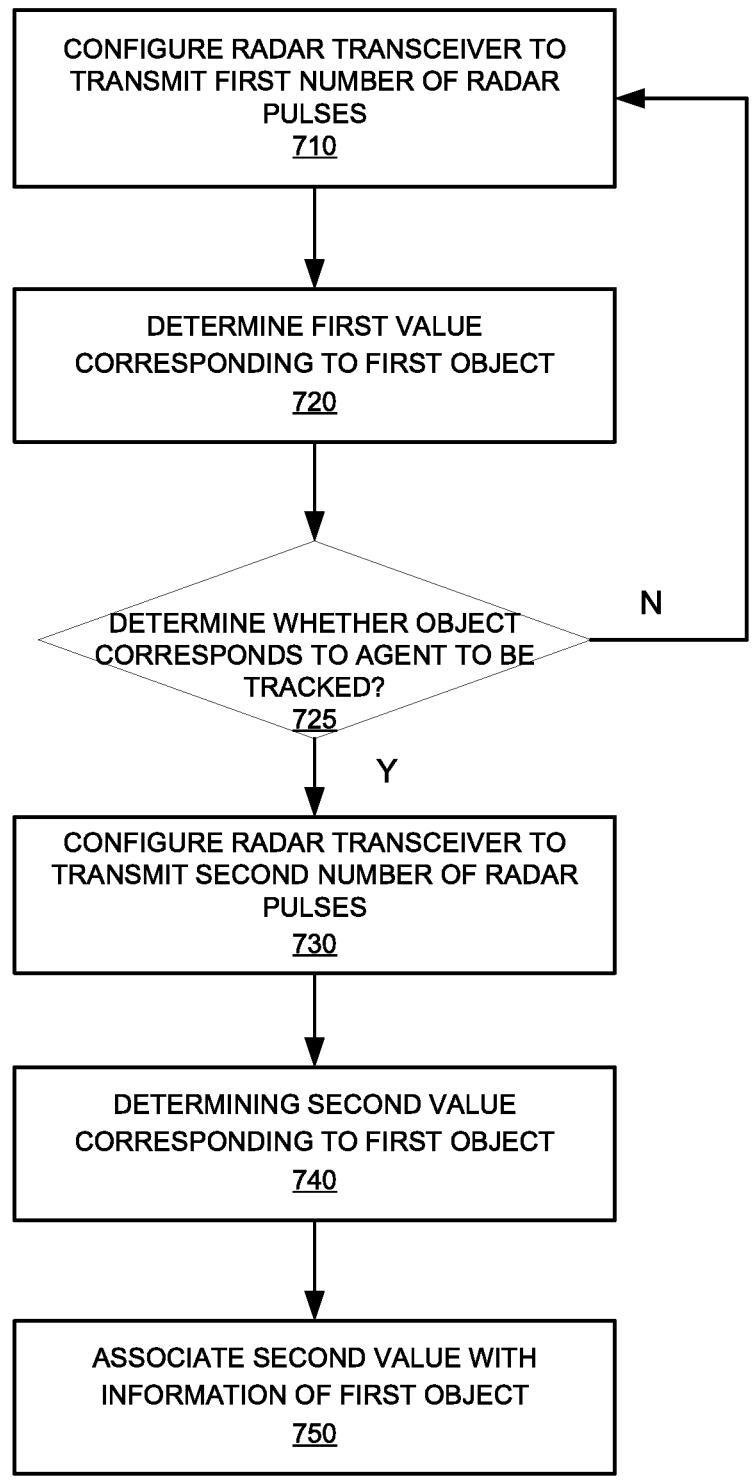
FIG. 7 illustrates an example method for performing a sequential high-resolution Doppler measurement.

FIG. 7 illustrates a method for performing a sequential high-resolution Doppler measurement. The method 700 may begin at step 710, a computing system may configure a radar transceiver to transmit a first number of radar pulses at a first pulse repetition frequency (PRF). As an example and not by way of limitation, the PRF of the first number of radar pulses may correspond to a low-resolution FFT measurement. At step, 720, the computing system may determine a first value corresponding to an object based on a first radar data received in response to the first number of radar pulses. In particular embodiments, the computing system may perform a first fast Fourier transform on a first radar data to obtain the first value that corresponds to a low-resolution Doppler frequency shift value of the object. In particular embodiments, at step 725, the computing system may determine whether the object corresponds to an agent to be tracked. As an example and not by way of limitation, the computing system may make this determination based on the value in step 720 being higher than a threshold value. If the value in step 720, is below the predetermined threshold value, the computing system may continue to configure the radar transceiver to transmit the first number of radar pulses at the first PRF. Otherwise, at step 730, the computing system may configure the radar transceiver to transmit a second number of radar pulses at a second PRF that is higher than the first PRF. At step 740, the computing system may determine a second value of the object based on a second radar data received in response to the second number of radar pulses. In particular embodiments, the computing system may perform a fast Fourier transform on a second radar data to obtain the second value that corresponds to a high-resolution Doppler frequency shift value of the object. At step 750, the computing system may associate the second value with information of the object.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for performing a sequential high-resolution Doppler measurement including the particular steps of the method of FIG. 7, this disclosure contemplates any suitable method for performing a sequential high-resolution Doppler measurement including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8A:
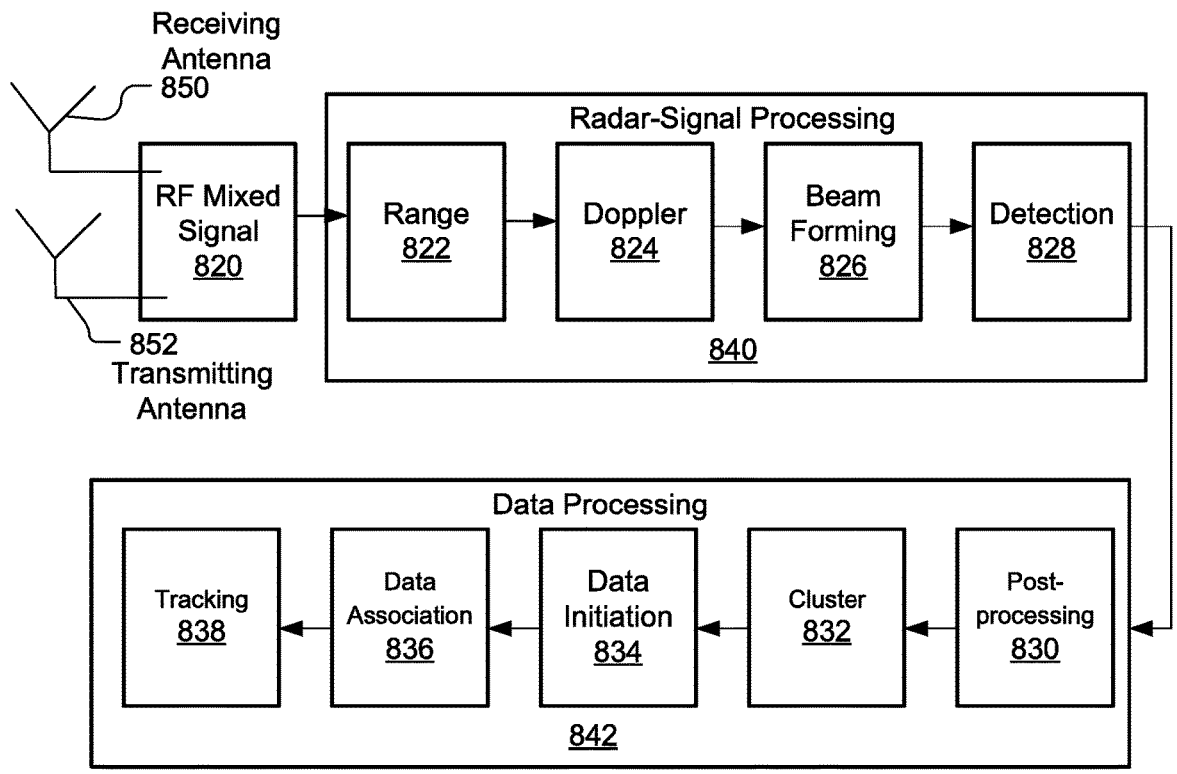
FIGS. 8A-8B illustrate an example radar system.
Figure 8B:
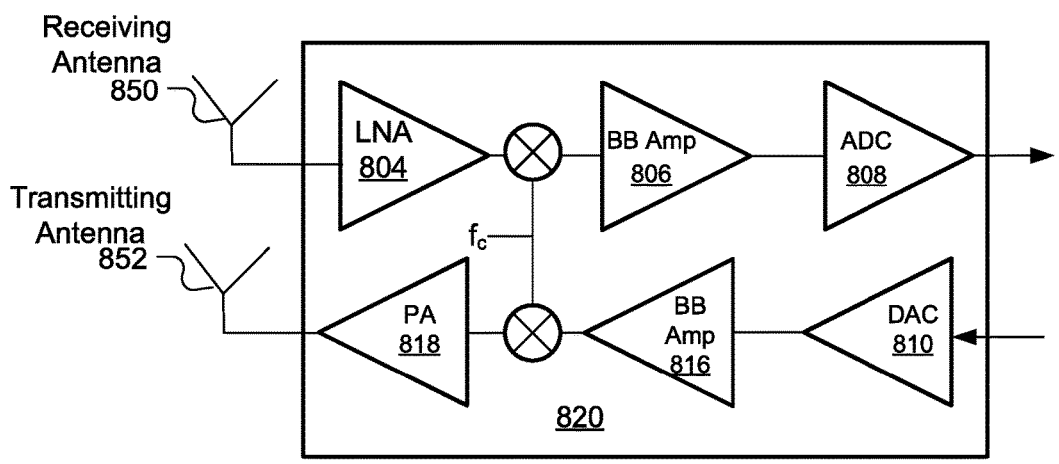

FIGS. 8A-8B illustrate a schematic of an example radar system. As illustrated in the example of FIG. 8A, a radar system 800 may include a receiving antenna 850, transmitting antenna 852, as well as a number of modules, such as an RF (radio-frequency) mixed-signal module 820, radar-signal processing module 840, and data-processing module 842. As described in more detail below, radar-signal processing module 840, which includes range processing module 822, doppler processing module 824, beamforming module 820, and detection module 825. Data processing module 842 includes post-processing module 830, clustering module 832, data initiation/termination 834, data association 836, and tracking module 838.

Radar-signal processing module 840 processes the reflected radar signals from RF mixed-signal module 820 to extract information of objects in the field of view of the radar system. Range processing module 822 of radar-signal processing module 840 may perform a mathematical transformation of the radar data to determine the distance or range of an object (e.g., agent) from the vehicle to the object by measuring the elapsed time between sending the radar signal and receiving the reflected signal from the object. Doppler processing module 824 may perform a mathematical transformation of the radar data from the time domain to the frequency domain to determine the velocity or Doppler of an object (e.g., agent) by measuring the frequency shift of the radar signal transmitted and the radar signal reflected by the object. Beamforming module 826 may perform a mathematical transformation of the radar data to determine the azimuth or lateral angle of an object (e.g., agent) by measuring the electronic phase scanning the radar signals. Detection module 828 may associate the range, Doppler, and azimuth data of the radar data to a particular object.

Data-processing module 840 processes the reflected radar signals from RF mixed-signal module 820 to extract information of objects in the field of view of the radar system. Post-processing module 830 may take the data vector contained in the Doppler, range, azimuth angle information from radar-signal processing module 840 and converts this data into relatable object and spatial information. Cluster module 832 may take the data from post-processing module 830 and determine clusters that may represent the data points obtained from post-processing module 830. In particular embodiment, data initiation/termination module 834 may determine whether and when the determined cluster is tracked as an agent (e.g., a moving object) and when to terminate the tracking. Data association module 836 may associate clusters of points from radar data captured at different times as representing the same object. In particular embodiments, the output of tracking module 838 may track a cluster of data points that represents a moving or static object from radar data captured at different times RF mixed-signal module 820 may transmit radar signals from transmitting antenna 852 and receive radar signals reflected by objects in the field of view of the radar system from receiving antenna 850. As illustrated in the example of FIG. 8B, the receiving side of RF mixed-signal module 820 includes a low-noise amplifier (LNA) 804, baseband amplifier 806, and analog-to-digital converter (ADC) 808. LNA 804 receives the reflected radar signals through receiving antenna 850 and since the received signals may be relatively low power, LNA 804 amplifies the signal while introducing minimal noise. The mixer on the receiving side of RF mixed-signal module 820 shifts the received radar signals from the carrier frequency ($f_c$) to the baseband frequency (low frequency). Baseband amplifier 806 amplifies the baseband radar signals to ADC 808. ADC 808 converts the received signals from the analog domain to the digital domain for downstream signal processing by the data-processing module 840.

As illustrated in the example of FIG. 8B, the transmission side of RF mixed-signal module 820 includes a digital-to-analog converter (DAC) 810, baseband amplifier 816, mixer, and power amplifier (PA) 818. A separate microcontroller determines one or more characteristics of the radar signals to be transmitted. As an example and not by way of limitation, these characteristics may include the pulse repetition frequency (PRF) or type of pulses to be transmitted by transmitting antenna 852. DAC 810 receives the radar signals as an analog signal and converts the digital information to analog waveforms. Baseband amplifier 816 amplifies the baseband (low frequency) radar signals to the transmission side mixer. The transmission side mixer upconverts the baseband radar signals to the carrier frequency that is suitable for transmission through the air. In particular embodiments, receiving antenna 850 and transmitting antenna 852 may be integrated into a single antenna.

Figure 9:
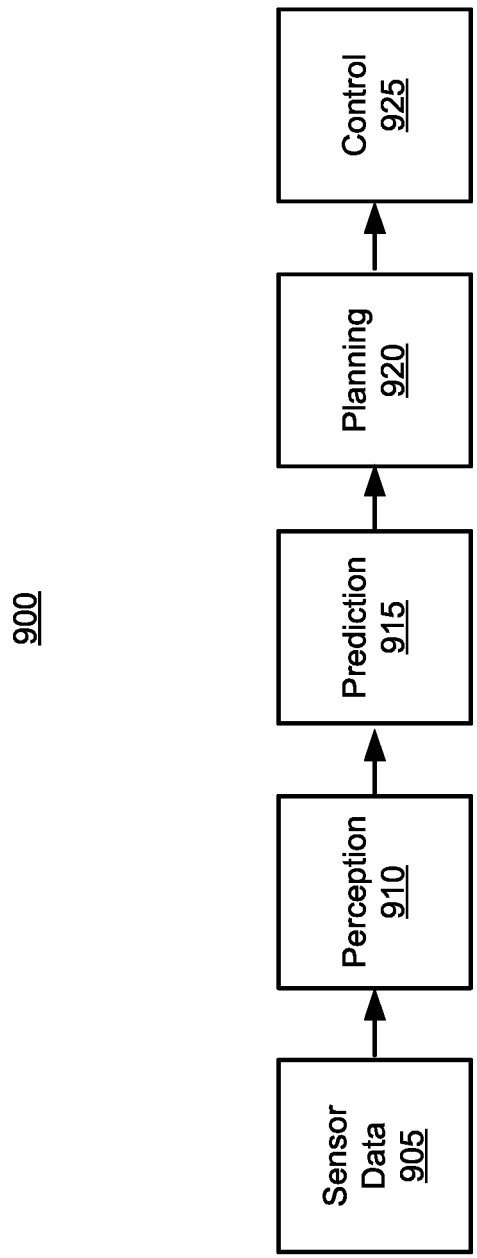
FIG. 9 illustrates an example driving-system navigation pipeline.

FIG. 9 illustrates an example block diagram of a driving-control navigation pipeline. In particular embodiments, a driving-control navigation pipeline 900 may include a number of computing modules, such as a sensor data module 905, perception module 910, prediction module 915, planning module 920, and control module 925. Sensor data module 905 may obtain and preprocess sensor/telemetry data that is provided to perception module 910. Such data may be captured by any suitable sensors of a vehicle. As an example and not by way of limitation, the vehicle may have a Light Detection and Ranging (LiDAR) sensor that is configured to transmit pulsed laser beams in multiple directions and measure the reflected signal from objects surrounding the vehicle. The time of flight of the light signals may be used to measure the distance or depth of the objects from the LiDAR. As another example, the vehicle may have optical cameras pointing in different directions to capture images of the vehicle's surroundings. Radar may also be used by the vehicle for detecting other vehicles and/or hazards at a distance. As further examples, the vehicle may be equipped with ultrasound for close-range object detection, e.g., parking and obstacle detection or infrared cameras for object detection in low-light situations or darkness. In particular embodiments, sensor data module 905 may suppress noise in the sensor data or normalize the sensor data.

Perception module 910 is responsible for correlating and fusing the data from the different types of sensors of the sensor module 905 to model the contextual environment of the vehicle. Perception module 910 may use information extracted by multiple independent sensors to provide information that would not be available from any single type of sensors. Combining data from multiple sensor types allows the perception module 910 to leverage the strengths of different sensors and more accurately and precisely perceive the environment. As an example and not by way of limitation, image-based object recognition may not work well in low-light conditions. This may be compensated by sensor data from LiDAR or radar, which are effective sensors for measuring distances to targets in low-light conditions. As another example, image-based object recognition may mistakenly determine that an object depicted in a poster is an actual three-dimensional object in the environment. However, if depth information from a LiDAR is also available, the perception module 910 could use that additional information to determine that the object in the poster is not, in fact, a three-dimensional object.

Perception module 910 may process the available data (e.g., sensor data, data from a high-definition map, etc.) to derive information about the contextual environment. For example, perception module 910 may include one or more agent modelers (e.g., object detectors, object classifiers, or machine-learning models trained to derive information from the sensor data) to detect and/or classify agents present in the environment of the vehicle (e.g., other vehicles, pedestrians, moving objects). Perception module 910 may also determine the various characteristics of the agents. For example, perception module 910 may track the velocities, moving directions, accelerations, trajectories, relative distances, or relative positions of these agents. In particular embodiments, perception module 910 may also leverage information from a high-definition map. The high-definition map may include a precise three-dimensional model of the environment, including buildings, curbs, street signs, traffic lights, and any stationary fixtures in the environment. Using the vehicle's GPS data and/or image-based localization techniques (e.g., simultaneous localization and mapping, or SLAM), the perception module 910 could determine the pose (e.g., position and orientation) of the vehicle or the poses of the vehicle's sensors within the high-definition map. The pose information, in turn, may be used by the perception module 910 to query the high-definition map and determine what objects are expected to be in the environment.

Perception module 910 may use the sensor data from one or more types of sensors and/or information derived therefrom to generate a representation of the contextual environment of the vehicle. As an example and not by way of limitation, the representation of the contextual environment may include objects such as other vehicles, curbs, debris, objects, and pedestrians. The contextual representation may be limited to a maximum range of the sensor array (e.g., 50, 100, or 200 meters). The representation of the contextual environment may include information about the agents and objects surrounding the vehicle, as well as semantic information about the traffic lanes, traffic rules, traffic signs, time of day, weather, and/or any other suitable information. The contextual environment may be represented in any suitable manner. As an example and not by way of limitation, the contextual representation may be encoded as a vector or matrix of numerical values, with each value in the vector/matrix corresponding to a predetermined category of information. For example, each agent in the environment may be represented by a sequence of values, starting with the agent's coordinate, classification (e.g., vehicle, pedestrian, etc.), orientation, velocity, trajectory, and so on. Alternatively, information about the contextual environment may be represented by a raster image that visually depicts the agent, semantic information, etc. For example, the raster image may be a birds-eye view of the vehicle and its surroundings, up to a predetermined distance. The raster image may include visual information (e.g., bounding boxes, color-coded shapes, etc.) that represent various data of interest (e.g., vehicles, pedestrians, lanes, buildings, etc.).

The representation of the present contextual environment from the perception module 910 may be consumed by a prediction module 915 to generate one or more predictions of the future environment. For example, given a representation of the contextual environment at time t, prediction module 915 may output another contextual representation for time $t_1$. For instance, if the t contextual environment is represented by a raster image, the output of the prediction module 915 may be another raster image (e.g., a snapshot of the current environment) that depicts where the agents would be at time $t_1$ (e.g., a snapshot of the future). In particular embodiments, prediction module 915 may include a machine-learning model (e.g., a convolutional neural network, a neural network, a decision tree, support vector machines, etc.) that may be trained based on previously recorded contextual and sensor data. For example, one training sample may be generated based on a sequence of actual sensor data captured by a vehicle at times t and $t_1$. The captured data at times t and $t_1$ may be used to generate, respectively, a first contextual representation (the training data) and a second contextual representation (the associated ground-truth used for training). During training, the machine-learning model may process the first contextual representation using the model's current configuration parameters and output a predicted contextual representation. The predicted contextual representation may then be compared to the known second contextual representation (i.e., the ground-truth at time $t_1$). The comparison may be quantified by a loss value, computed using a loss function. The loss value may be used (e.g., via back-propagation techniques) to update the configuration parameters of the machine-learning model so that the loss would be less if the prediction were to be made again. The machine-learning model may be trained iteratively using a large set of training samples until a convergence or termination condition is met. For example, training may terminate when the loss value is below a predetermined threshold. Once trained, the machine-learning model may be used to generate predictions of future contextual representations based on current contextual representations.

Planning module 920 may determine the navigation routes and particular driving operations (e.g., slowing down, speeding up, stopping, swerving, etc.) of the vehicle based on the predicted contextual representation generated by the prediction module 915. In particular embodiments, planning module 920 may utilize the predicted information encoded within the predicted contextual representation (e.g., predicted location or trajectory of agents, semantic data, etc.) and any other available information (e.g., map data, traffic data, accident reports, weather reports, target destinations, and any other suitable information) to determine one or more goals or navigation instructions for the vehicle. As an example and not by way of limitation, based on the predicted behavior of the agents surrounding the vehicle and the traffic data to a particular destination, planning module 920 may determine a particular navigation path and associated driving operations for the vehicle to avoid possible collisions with one or more agents. In particular embodiments, planning module 920 may generate, based on a given predicted contextual presentation, several different plans (e.g., goals or navigation instructions) for the vehicle. For each plan, the planning module 920 may compute a score that represents the desirability of that plan. For example, if the plan would likely result in the vehicle colliding with an agent at a predicted location for that agent, as determined based on the predicted contextual representation, the score for the plan may be penalized accordingly. Another plan that would cause the vehicle to violate traffic rules or take a lengthy detour to avoid possible collisions may also have a score that is penalized, but the penalty may be less severe than the penalty applied for the previous plan that would result in a collision. A third plan that causes the vehicle to simply stop or change lanes to avoid colliding with the agent in the predicted future may receive the highest score. Based on the assigned scores for the plans, the planning module 920 may select the best plan to carry out. While the example above used a collision as an example, the disclosure herein contemplates the use of any suitable scoring criteria, such as travel distance or time, fuel economy, changes to the estimated time of arrival at the destination, passenger comfort, proximity to other vehicles, the confidence score associated with the predicted contextual representation, etc.

Based on the plan generated by planning module 920, which may include one or more navigation path or associated driving operations, control module 925 may determine the specific commands to be issued to the actuators of the vehicle. The actuators of the vehicle are components that are responsible for moving and controlling the vehicle. The actuators control driving functions of the vehicle, such as, for example, steering, turn signals, deceleration (braking), acceleration, gear shift, etc. As an example and not by way of limitation, control module 925 may transmit commands to a steering actuator to maintain a particular steering angle for a particular amount of time to move a vehicle on a particular trajectory to avoid agents predicted to encroach into the area of the vehicle. As another example, control module 925 may transmit commands to an accelerator actuator to have the vehicle safely avoid agents predicted to encroach into the area of the vehicle.

Figure 10:
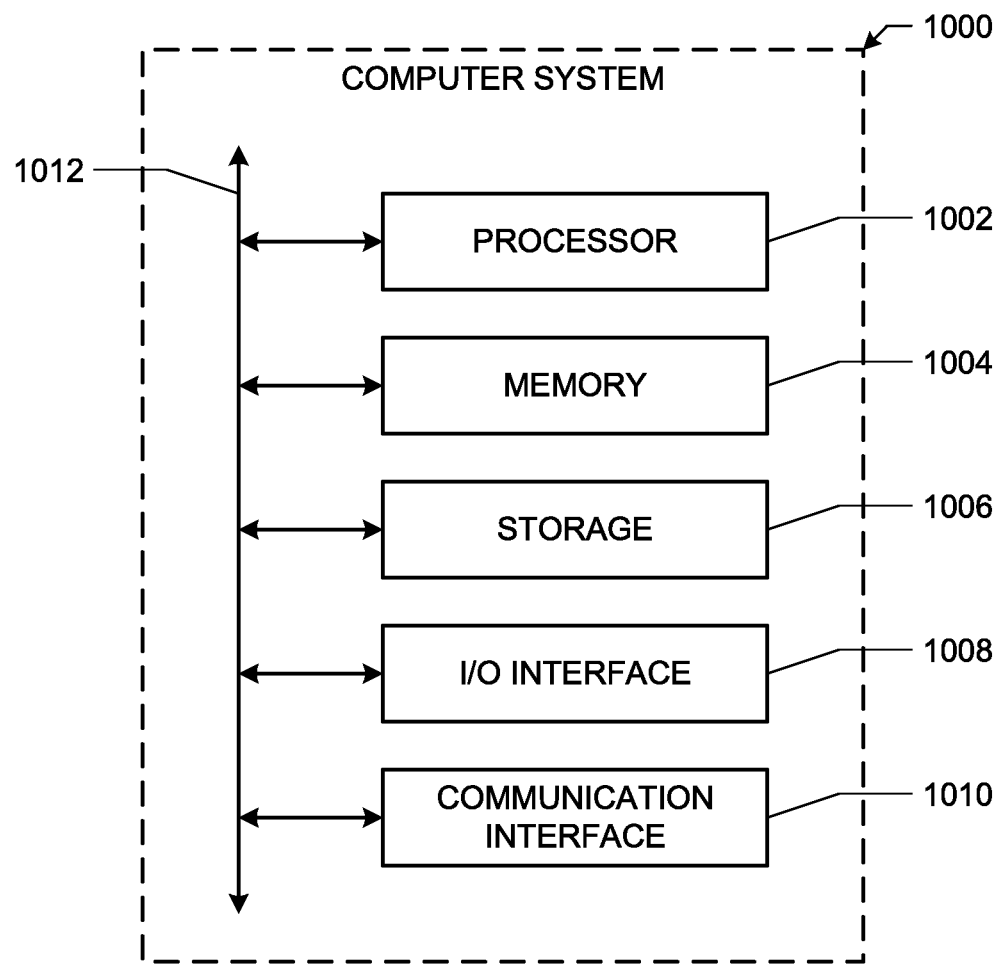
FIG. 10 illustrates an example of a computing system.

FIG. 10 illustrates an example computer system. In particular embodiments, one or more computer systems 1000 perform one or more steps of one or more methods described or illustrated herein. In particular embodiments, one or more computer systems 1000 provide the functionalities described or illustrated herein. In particular embodiments, software running on one or more computer systems 1000 performs one or more steps of one or more methods described or illustrated herein or provides the functionalities described or illustrated herein. Particular embodiments include one or more portions of one or more computer systems 1000. Herein, a reference to a computer system may encompass a computing device, and vice versa, where appropriate. Moreover, a reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 that are to be operated on by computer instructions; the results of previous instructions executed by processor 1002 that are accessible to subsequent instructions or for writing to memory 1004 or storage 1006; or any other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs), be a multi-core processor, or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described in further detail below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
transmitting, using a radar transceiver, a first number of radar pulses at a first pulse repetition frequency (PRF);
determining a first value identifying a first object from a first radar data received in response to the first number of radar pulses, wherein the first value being higher than a predetermined threshold value indicates a presence of the first object, wherein determining the first value includes performing a first fast Fourier transform (FFT) on the first radar data to obtain a low-resolution shift value of the first object;
transmitting a second number of radar pulses at a second PRF that corresponds to a first Doppler frequency shift associated with the first object;
determining a second value about the first object in response to the second number of radar pulses by performing a second fast Fourier transform (FFT) on a second radar data associated with the second number of radar pulses to obtain a high-resolution shift value of the first object, wherein the first FFT and the second FFT are executed sequentially with different fast Fourier transforms; and
outputting at least a velocity of the first object according to the second value.

2. The method of claim 1, further comprising determining a frequency bin corresponding to the low-resolution shift value.

3. The method of claim 2, wherein the frequency bin is associated with the first object based on the first value being higher than a predetermined threshold value.

4. The method of claim 1, further comprising:
determining a third value corresponding to a second object based, at least in part, on the first radar data received in response to the first number of radar pulses, wherein the second object is identified based on the third value satisfying a predetermined threshold value;
transmitting a third number of radar pulses at a third PRF, wherein the third PRF corresponds to a second Doppler frequency shift associated with the second object; and
performing a third fast Fourier transform (FFT) on a third radar data received in response to the third number of radar pulses.

5. The method of claim 1, further comprising:
filtering one or more data points of the first radar data that is lower than a predetermined received signal strength indicator (RSSI) threshold value; and
determining the first PRF based, at least in part, on remaining data points of the first radar data that are not filtered according to the predetermined RSSI threshold value.

6. The method of claim 1, wherein the first PRF is lower than the second PRF.

7. The method of claim 4, further comprising providing a second Doppler value for subsequent trajectory prediction.

8. One or more computer-readable non-transitory storage media embodying software that is operable when executed to cause one or more processors to perform operations comprising:
transmitting, using a radar transceiver, a first number of radar pulses at a first pulse repetition frequency (PRF);
determining a first value identifying a first object from a first radar data received in response to the first number of radar pulses, wherein the first value being higher than a predetermined threshold value indicates a presence of the first object, wherein determining the first value includes performing a first fast Fourier transform (FFT) on the first radar data to obtain a low-resolution shift value of the first object;
transmitting a second number of radar pulses at a second PRF that corresponds to a first Doppler frequency shift associated with the first object;
determining a second value about the first object in response to the second number of radar pulses by performing a second fast Fourier transform (FFT) on a second radar data associated with the second number of radar pulses to obtain a high-resolution shift value of the first object, wherein the first FFT and the second FFT are executed sequentially with different fast Fourier transforms; and
outputting at least a velocity of the first object according to the second value.

9. The media of claim 8, wherein the software is further operable to:
performing a first fast Fourier transform (FFT) on the first radar data to obtain a low-resolution shift value of the first object; and
performing a second fast Fourier transform (FFT) on a second radar data to obtain a high-resolution shift value of the first object, wherein the first FFT and the second FFT are different algorithms.

10. The media of claim 9, wherein the software is further operable to determine a frequency bin corresponding to the low-resolution shift value.

11. The media of claim 10, wherein the frequency bin is associated with the first object based on the first value being higher than a predetermined threshold value.

12. The media of claim 8, wherein the software is further operable to perform operations comprising:
determining a third value corresponding to a second object, at least in part, on the first radar data received in response to the first number of radar pulses, wherein the second object is identified based on the third value satisfying a predetermined threshold value;
transmitting a third number of radar pulses at a third PRF, wherein the third PRF corresponds to a second Doppler frequency shift associated with the second object; and
perform a third fast Fourier transform (FFT) on a third radar data received in response to the third number of radar pulses.

13. The media of claim 8, wherein the software is further operable to perform operations comprising:
filtering one or more data points of the first radar data that is lower than a predetermined received signal strength indicator (RSSI) threshold value; and
determining the first PRF based on remaining data points of the first radar data that are not filtered according to the predetermined RSSI threshold value.

14. A computing system comprising:
one or more processors; and
one or more computer-readable non-transitory storage media coupled to one or more of the processors, the one or more computer-readable non-transitory storage media comprising instructions operable when executed by one or more of the processors to cause the computing system to perform operations comprising:
transmitting, using a radar transceiver, a first number of radar pulses at a first pulse repetition frequency (PRF);
determining a first value identifying a first object from a first radar data received in response to the first number of radar pulses, wherein the first value being higher than a predetermined threshold value indicates a presence of the first object, wherein determining the first value includes performing a first fast Fourier transform (FFT) on the first radar data to obtain a low-resolution shift value of the first object;
transmitting a second number of radar pulses at a second PRF that corresponds to a first Doppler frequency shift associated with the first object;
determining a second value about the first object in response to the second number of radar pulses by performing a second fast Fourier transform (FFT) on a second radar data associated with the second number of radar pulses to obtain a high-resolution shift value of the first object, wherein the first FFT and the second FFT are executed sequentially with different fast Fourier transforms; and
outputting at least a velocity of the first object according to the second value.

15. The system of claim 14, wherein the processors are further operable to perform operations comprising:
performing a first fast Fourier transform (FFT) on the first radar data to obtain a low-resolution shift value of the first object; and
performing a second fast Fourier transform (FFT) on a second radar data to obtain a high-resolution Doppler frequency shift value of the first object, wherein the first FFT and the second FFT are different algorithms.

16. The system of claim 14, wherein the processors are further operable to perform operations comprising determine a frequency bin corresponding to the low-resolution shift value.

17. The system of claim 16, wherein the frequency bin is associated with the first object based on the first value being higher than a predetermined threshold value.

18. The system of claim 14, wherein the processors are further operable to perform operations comprising:
determining a third value corresponding to a second object based on the first radar data received in response to the first number of radar pulses, wherein the second object is identified based on the third value satisfying a predetermined threshold value;
transmitting a third number of radar pulses at a third PRF, wherein the third PRF corresponds to a second Doppler frequency shift associated with the second object; and
performing a third fast Fourier transform (FFT) on a third radar data received in response to the third number of radar pulses.

19. The system of claim 14, wherein the processors are further operable to perform operations comprising:
filtering one or more data points of the first radar data that is lower than a predetermined received signal strength indicator (RSSI) threshold value; and
determining the first PRF based on remaining data points of the first radar data that are not filtered according to the predetermined RSSI threshold value.

* * * * *